W. S. PURDY.
CAR WHEEL CONSTRUCTION.
APPLICATION FILED OCT. 7, 1915.
1,165,445.
Patented Dec. 28, 1915.
2 SHEETS—SHEET 1.
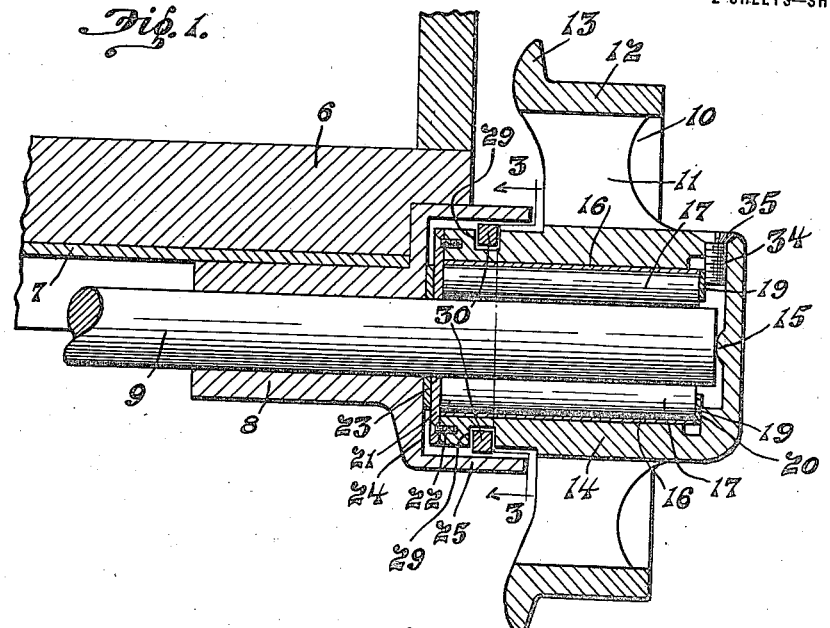
Witness
Robert O. Karcher
Inventor
Walter S. Purdy.
By F. W. Bond
Attorney W. S. PURDY.
CAR WHEEL CONSTRUCTION.
APPLICATION FILED OCT. 7, 1915.
1,165,445.
Patented Dec. 28, 1915.
2 SHEETS—SHEET 2.
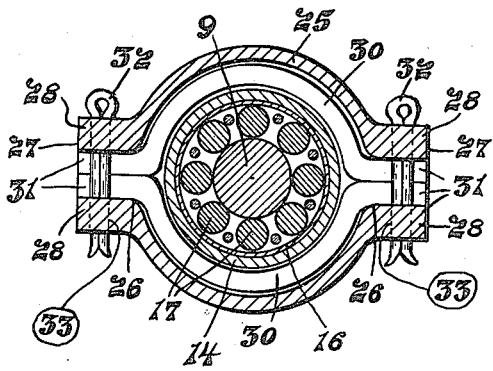
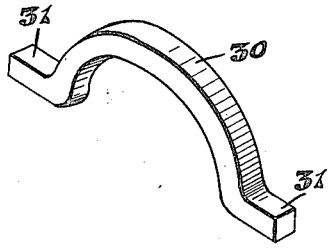
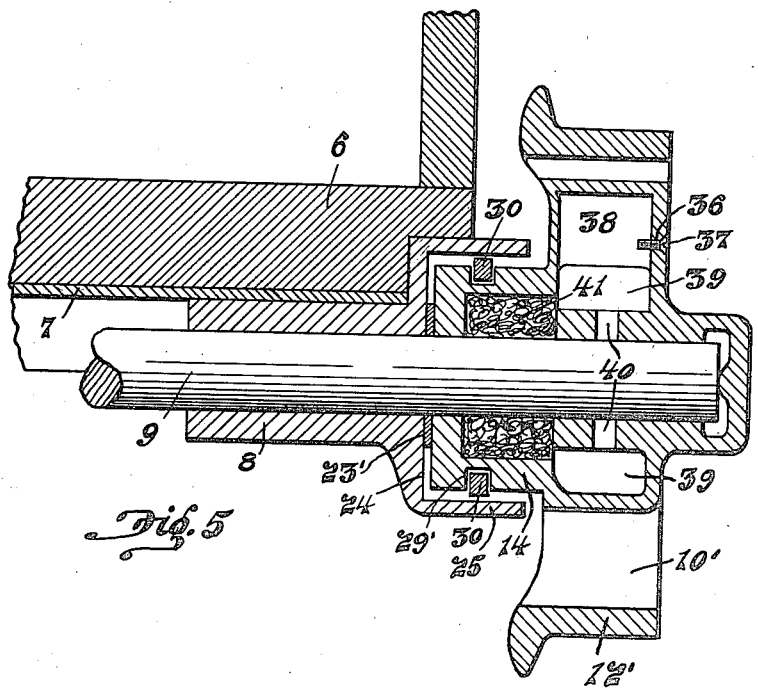
Witness
Robert O. Karcher
Inventor
Walter S. Purdy.
By F. W. Bond
Attorney

UNITED STATES PATENT OFFICE.

WALTER S. PURDY, OF CANAL FULTON, OHIO, ASSIGNOR TO THE FULTON PIT CAR & MANUFACTURING COMPANY, OF CANAL FULTON, OHIO, A CORPORATION OF OHIO.

CAR-WHEEL CONSTRUCTION.

1,165,445.

Specification of Letters Patent.

Patented Dec. 28, 1915.

Application filed October 7, 1915. Serial No. 54,526.

*To all whom it may concern:*

Be it known that I, WALTER S. PURDY, a citizen of the United States, residing at Canal Fulton, in the county of Stark and State of Ohio, have invented a new and useful Car-Wheel Construction, of which the following is a specification.

The present invention relates to car wheel construction and has more especial reference to the construction of wheels for mine cars and the like.

The object of the present invention is the provision of means by which a car wheel may be readily mounted upon or removed from the axle.

A further object is to provide curved keys having lateral extremities by means of which the car wheel may be easily attached to or detached from the axle.
A still further object is the provision of a simple and inexpensive structure of the character referred to, which will be durable and effective.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

In the drawings: Figure 1 is a longitudinal sectional view of a wheel constructed in accordance with the present invention, showing a portion of the axle and the car upon which said axle is mounted. Fig. 2 is a side elevation of the same. Fig. 3 is a section on line 3—3, Fig. 1. Fig. 4 is a detail perspective view of one of the curved keys which retain the wheel upon the axle. Fig. 5 is a view similar to Fig. 1 showing a modified form of construction.

Similar numerals of reference indicate corresponding parts throughout the several figures of the drawings.
Referring more especially to the construction illustrated in the accompanying drawings the numeral 6 indicates a portion of the car body upon the lower side of which is mounted a channel iron 7 to which is connected in any suitable and well known manner the boxing 8, which forms a bearing for the axle 9. The wheel 10 is provided with the usual spokes 11 and rim 12, said rim being provided with the usual flange 13, the hub 14 of said wheel being closed at its outer extremity and provided with a projection 15 which receives the end thrust of the axle.

The construction shown in Figs. 1, 2 and 3 comprises a roller bearing, a steel lining 16 being provided to retain the rollers 17. A wearing washer 19 is provided at the outer extremity of the roller bearing cage and engages the annular shoulder 20 formed upon the hub and a steel plate 21 is connected to said hub by means of screws 22 for the purpose of holding the roller structure within the wheel, a wearing washer 23 being interposed between said plate and the face 24 of the boxing.

The boxing 8 is provided with the annular flange 25 which is located around the hub and extends forwardly to a point adjacent the spokes 11 of the wheel. The flange 25 is provided upon diametrically opposite sides with the cut-out portions 26 and adjacent said cut-out portions with the projections 27, the spaced walls 28 formed upon said projections registering with said cut-out portions. The hub is provided with an annular groove 29 which is adapted to receive the curved keys 30 when the wheel is assembled upon the axle. In assembling the wheel upon the axle these curved keys are placed within the groove 29 and the wheel is then placed upon the axle and moved into position thereon, the straight portions 31 of the curved keys sliding into position between the walls 28 and cotter pins or their equivalents are then placed in suitable apertures 33 formed in said walls, thus retaining the wheel within the boxing. The numeral 34 indicates a grease aperture, which is provided with a screw threaded plug 35.

In Fig. 5 is illustrated a form of wheel in which no roller bearings are used, all of the parts being the same as that above described with the exception of the interior construction of the wheel. The wheel 10' is provided with the usual flanged rim 12' and hub 14', said hub being provided with the annular groove 29' which receives the curved keys in the same manner as above described. A wearing washer 23' is placed upon the axle and between the inner face of the hub and the face 24 of the boxing. The oil or grease aperture 36 is provided with a screw threaded plug 37, said grease aperture communicating with the oil basin 38, said oil basin communicating with the oil race 39, which is provided with radially disposed oil apertures 40 for the purpose of lubricating the axle. Hair packed oil chambers 41 are located within the hub for further lubricating the axle.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. In a structure of the character described, an axle, a boxing having notches upon diametrically opposite sides and outwardly extending, spaced walls located adjacent each of said notches, a wheel having a hub surrounding said axle and extending into said boxing and an annular circumferential shoulder, a curved key concentrically engaging said hub at said shoulder, and provided with radially disposed extremities located within the notches and between the spaced walls on said boxing and pins located through said spaced walls and engaging said extremities.

2. In a structure of the character described, an axle, a boxing having notches upon diametrically opposite sides and outwardly extending, spaced walls located adjacent each of said notches, a wheel having a hub surrounding said axle and extending into said boxing and an annular circumferential groove, a pair of curved keys concentrically engaging said hub within said groove and provided with radially disposed extremities located within the notches and between said spaced walls on said boxing and pins located through said spaced walls and engaging the extremities of said keys.

3. In a structure of the character described, an axle, a boxing, rollers surrounding said axle, a cage to support the rollers, a wheel having a hub surrounding said axle and said cage and rollers and extending into said boxing and having an annular, circumferential shoulder and a key combined with said boxing and concentrically engaging said hub at said shoulder.

4. In a structure of the character described, an axle, a boxing having notches upon diametrically opposite sides, a wheel having a hub surrounding said axle and extending into said boxing and an annular circumferential shoulder, a curved key concentrically engaging said hub at said shoulder and provided with radially disposed extremities located within the notches in said boxing and pins located in said boxing and engaging said extremities.

5. In a structure of the character described, an axle, a boxing having notches upon diametrically opposite sides, a wheel having a hub surrounding said axle and extending into said boxing and an annular circumferential groove, a pair of curved keys concentrically engaging said hub within said groove and provided with radially disposed extremities located within the notches and pins located in said boxing and engaging the extremities of said keys.

6. In a structure of the character described, an axle, a boxing having notches upon diametrically opposite sides, a wheel having a hub surrounding said axle and extending into said boxing and an annular, circumferential groove, a pair of curved keys concentrically engaging said hub within said groove, each of said keys comprising a semicircular portion and radially disposed extremities located within the notches and pins located in said boxing and engaging the extremities of said keys.

7. In a structure of the character described, an axle, a boxing having notches upon diametrically opposite sides, a wheel having a hub surrounding said axle and extending into said boxing and an annular, circumferential shoulder, a curved key concentrically engaging said hub at said shoulder, said key comprising a semi-circular portion and radially disposed extremities located within the notches in said boxing and pins located in said boxing and engaging said extremities.

8. In a structure of the character described, an axle, a boxing having notches upon diametrically opposite sides and outwardly extending, spaced walls located adjacent each of said notches, a wheel having a hub surrounding said axle and extending into said boxing and an annular circumferential groove, a pair of curved keys concentrically engaging said hub within said groove and provided with radially disposed extremities located within the notches and between said spaced walls on said boxing, and means carried by said spaced walls for engaging the extremities of said keys.

9. In a structure of the character described, an axle, a boxing having notches upon diametrically opposite sides and outwardly extending, spaced walls located adjacent each of said notches, a wheel having a hub surrounding said axle and extending into said boxing and an annular circumferential shoulder, a curved key concentrically engaging said hub at said shoulder, and provided with radially disposed extremities located within the notches and between the spaced walls on said boxing, and means carried by said spaced walls for engaging the extremities of said keys.

In testimony that I claim the above, I have hereunto subscribed my name.

WALTER S. PURDY.